(12) United States Patent
Sterner et al.

(10) Patent No.: US 7,436,571 B2
(45) Date of Patent: Oct. 14, 2008

(54) MICRO-DISPLAYS

(75) Inventors: John R Sterner, Albany, OR (US);
Charles C Haluzak, Corvallis, OR (US);
William R Boucher, Corvallis, OR (US); Scott Lerner, Corvallis, OR (US);
James W. Ring, Blodgett, OR (US);
Brett Dahlgren, Lebanon, OR (US);
Chien-Hua Chen, Corvallis, OR (US);
Arthur Piehl, Corvallis, OR (US); Quan Qi, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 310 days.

(21) Appl. No.: 10/971,637

(22) Filed: Oct. 20, 2004

(65) Prior Publication Data

US 2006/0082737 A1 Apr. 20, 2006

(51) Int. Cl.
*G02B 26/00* (2006.01)
*G02B 26/08* (2006.01)
*G02F 1/29* (2006.01)

(52) U.S. Cl. .................. 359/290; 359/295; 359/298
(58) Field of Classification Search ................ 359/290, 359/291, 292, 295, 298
See application file for complete search history.

(56) References Cited

U.S. PATENT DOCUMENTS

| | | | | |
|---|---|---|---|---|
| 6,075,581 | A * | 6/2000 | Shirochi | 349/112 |
| 6,603,897 | B1 * | 8/2003 | Scholz | 385/24 |
| 6,836,597 | B2 * | 12/2004 | Chan | 385/39 |
| 7,123,216 | B1 * | 10/2006 | Miles | 345/54 |

* cited by examiner

*Primary Examiner*—Ricky Mack
*Assistant Examiner*—Brandi N Thomas (57) ABSTRACT

A micro-display has a device chip with a transparent layer overlying one or more micro-electromechanical system devices. A transparent cover overlies the transparent layer. An index-of-refraction-matching medium is interposed between the transparent layer and the transparent cover. An index of refraction of the index-of-refraction-matching medium is substantially equal to an index of refraction of the transparent layer and the transparent cover.

20 Claims, 10 Drawing Sheets

MICRO-DISPLAYS

BACKGROUND

Digital projectors often include micro-displays that include arrays of pixels (e.g., 1280×1024, etc.) Each pixel usually includes a micro-electromechanical system (MEMS) device, such as a micro-mirror, liquid crystal on silicon (LcoS) device, interference-based modulator, etc. A micro-display is used with a light source and projection lens of the digital projector. The micro-display receives light from the light source. When the pixels of the micro-display are ON, the pixels direct the light to the projection lens. When the pixels are OFF, they do not direct the light toward the light source, e.g., they may direct the light from the light source away from the projection lens, absorb the light, etc. The projection lens images and magnifies the micro-display.

Many micro-displays include a transparent, e.g., glass, cover for packaging, e.g., sealing and/or protecting, the pixels. However, when the pixels are OFF, the transparent cover can reflect some light to the projection lens. This degrades the "Black/White Contrast ratio" that is often defined as the ratio of the light imaged by the projection lens when all of the pixels in the micro-display are ON to the light imaged by the projection lens when all of the pixels are OFF and is a measure of the blackness of the projector's black state.

The pixels of many micro-displays are formed on a semiconductor substrate using semiconductor processing methods, and the transparent cover is adhered to a layer, e.g., an oxide layer, formed on the substrate overlying the pixels. However, the interface between the layer and the cover may have a substantially different index of refraction than either the layer or the cover, e.g., due to air gaps etc. This causes some of the light that reaches the cover to be reflected by the cover to the projection lens, which acts to reduce the contrast ratio.

SUMMARY

One embodiment of the invention provides a micro-display that has a device chip with a transparent layer overlying one or more micro-electromechanical system devices. A transparent cover overlies the transparent layer. An index-of-refraction-matching medium is interposed between the transparent layer and the transparent cover. An index of refraction of the index-of-refraction-matching medium is substantially equal to an index of refraction of the transparent layer and the transparent cover.

DETAILED DESCRIPTION

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and equivalents thereof.

Figure 1:
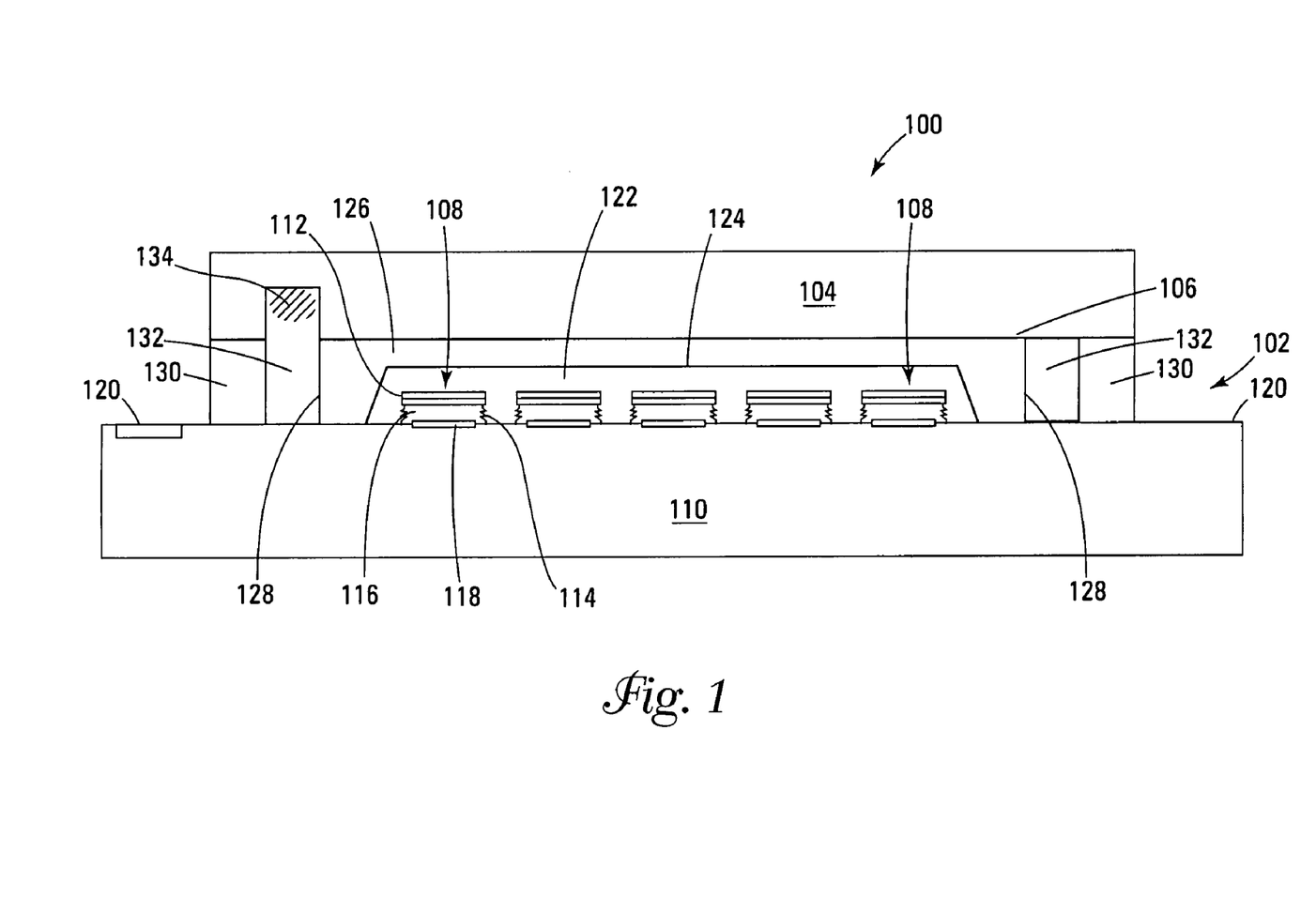
FIG. 1 is a cross-sectional view illustrating a micro-display, according to an embodiment of the invention.

FIG. 1 is a cross-sectional view illustrating a micro-display 100, e.g., as a portion of a digital projector, according to an embodiment of the invention. For one embodiment, micro-display 100 functions as a light modulator of the digital projector. Micro-display 100 includes a device die (or device chip) 102 and a transparent cover 104, e.g., a glass cover having a low coefficient of expansion, with an index-of-refraction-matching medium 106 interposed between device chip 102 and transparent cover 104. Index-of-refraction-matching medium 106 acts to reduce reflections from transparent cover 104 by substantially matching the index of refraction at the interface between transparent cover 104 and device chip 102 to transparent cover 104 and device chip 102. For one embodiment, index-of-refraction-matching medium 106 is an elastomer, such as silicone, Polydimethylsiloxane (PDMS), etc. Polyimide is also suitable. For other embodiments, index-of-refraction-matching medium 106 may be a gel, and adhesive that cures into a solid, or a liquid.

Device chip 102 includes an array of pixels 108 (e.g., 1280×1024 pixels, etc.) formed on a semiconductor substrate 110, e.g., of silicon or the like. For one embodiment, each pixel 108 is a MEMS device, such as a micro-mirror, liquid crystal on silicon (LcoS) device, interference-based modulator, etc. Specifically, for another embodiment the MEMS device includes a micro-mirror 112 supported by flexures 114 so that a gap 116 separates the micro-mirror 112 from an electrode 118. For one embodiment, electrodes 118 are electrically connected to contacts 120 formed in substrate 110. A gap 122 separates micro-mirror 112 from a partially reflective layer 124, e.g., a tantalum aluminum (TaAl) layer, formed on the underside of a transparent layer 126, e.g., of TEOS (tetraethylorthosilicate) oxide, silicon oxide, etc., formed on substrate 110. Transparent layer 126 acts to reinforce and protect partially reflective layer 124. For one embodiment, transparent layer 126 includes sidewalls 128 located on either side of the pixel array that extend from substrate 110. Therefore, transparent layer 126 contains (or encloses) the pixel array.

Transparent cover 104 is adhered to a seal ring 130, e.g., by plasma-enhanced bonding, laser-assisted welding, gluing, or the like, that surrounds transparent layer 126 and protrudes from substrate 110. For one embodiment, seal ring 130 is of the same material as transparent layer 126. A gap 132 is formed between seal ring 130 and sidewalls 128 of transparent layer 126. Index-of-refraction-matching medium 106 is interposed between transparent layer 126 and transparent cover 104. Transparent cover 104 and seal ring 130, for some embodiments, hermetically seal micro-display 100. For another embodiment, transparent cover 104 contains a desiccant 134.

Figure 2:
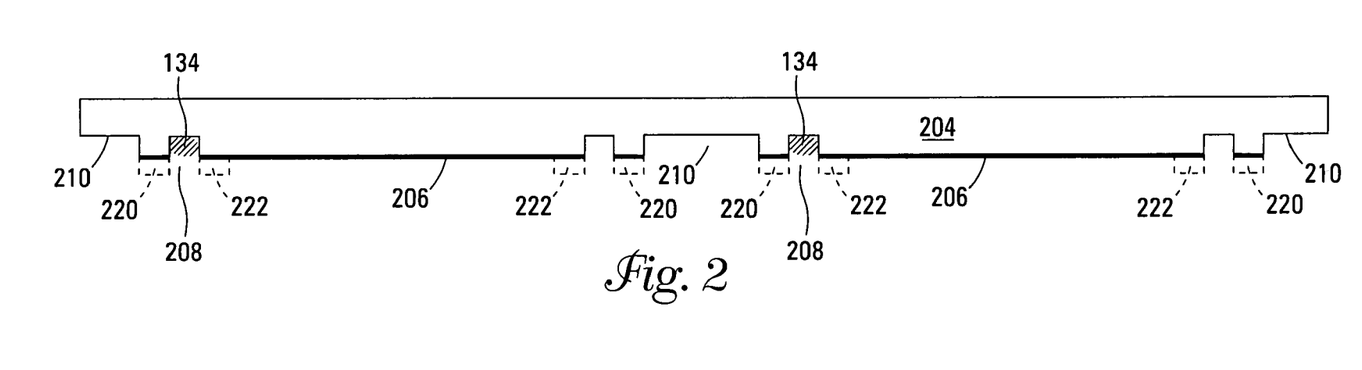
FIGS. 2-5 are cross-sectional views of a plurality of micro-displays, during various stages of fabrication, according to another embodiment of the invention.
Figure 3:
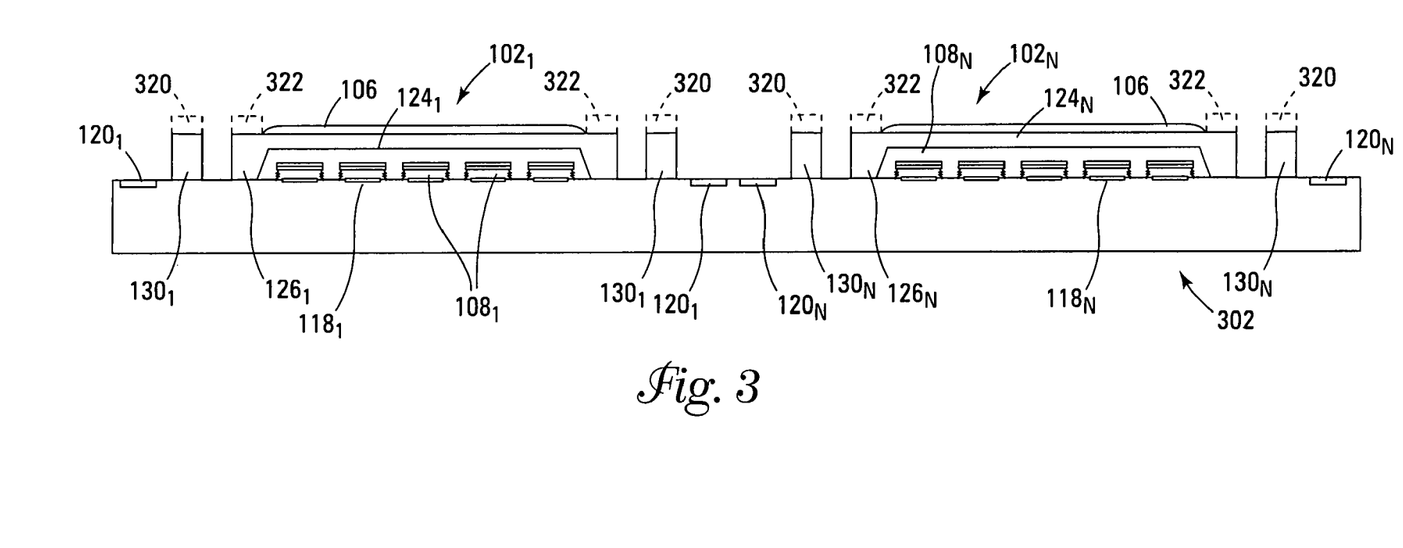

FIGS. 2-5 are cross-sectional views of a plurality of micro-displays, such as micro-displays 100, during various stages of fabrication, according to another embodiment of the invention. FIG. 2 shows a transparent cover 204 for covering a plurality of device chips, according to another embodiment of the invention. Specifically, a transparent layer 206, e.g., of TEOS (tetraethylorthosilicate) oxide, silicon oxide, etc. is formed on one side of transparent cover 204, e.g., by chemical vapor deposition. Slots 208 are formed in transparent cover 204 and desiccant 134 is disposed therein. Recesses 210 are also formed in transparent cover 204. FIG. 3 illustrates a plurality of device chips 102, e.g., formed as a single device wafer 302, according to another embodiment of the invention. Device wafer 302 can be fabricated using various semiconductor processing methods that are known to those skilled in the art.

For one embodiment, the transparent layers 126 and seal rings 130 of device wafer 302 and transparent layer 206 of transparent cover 204 are treated with plasma in preparation for plasma bonding transparent cover 204 to device wafer 302. Then, index-of-refraction-matching medium 106 is disposed on transparent layers 126, e.g., using a syringe etc. For one embodiment, index-of-refraction-matching medium 106 has substantially the same index of refraction as transparent layer 206 of transparent cover 204. Note that transparent cover 204, transparent layer 206 of transparent cover 204, and transparent layers 126 have substantially the same indices of refraction. For some embodiments, thermal or ultra-violet processes may be used to partially cure and/or stabilize index-of-refraction-matching medium 106 to provide for chemical inertness and for mechanical stability.

For one embodiment, transparent layer 206 includes stand-offs 220 for mating with seal rings 130. This creates a gap between transparent layer 206 and transparent layer 126 for the index-of-refraction-matching medium 106 when transparent cover 204 is adhered to seal rings 130. Alternatively, increasing the height of seal rings 130, as indicated by the dashed regions 320 in FIG. 3, can create this gap. For another embodiment, transparent layer 206 includes stand-offs 222, as shown in FIG. 2, for mating with portions of transparent layer 126. Stand-offs 222 contain the index-of-refraction-matching medium 106 within the gap. Alternatively, adding stand-offs 322 to portions of transparent layer 126, as shown in FIG. 3, contains the index-of-refraction-matching medium 106 within the gap. For some embodiments, the index-of-refraction-matching medium 106 may be left in a liquid state and is held in place by surface tension.

Figure 4:
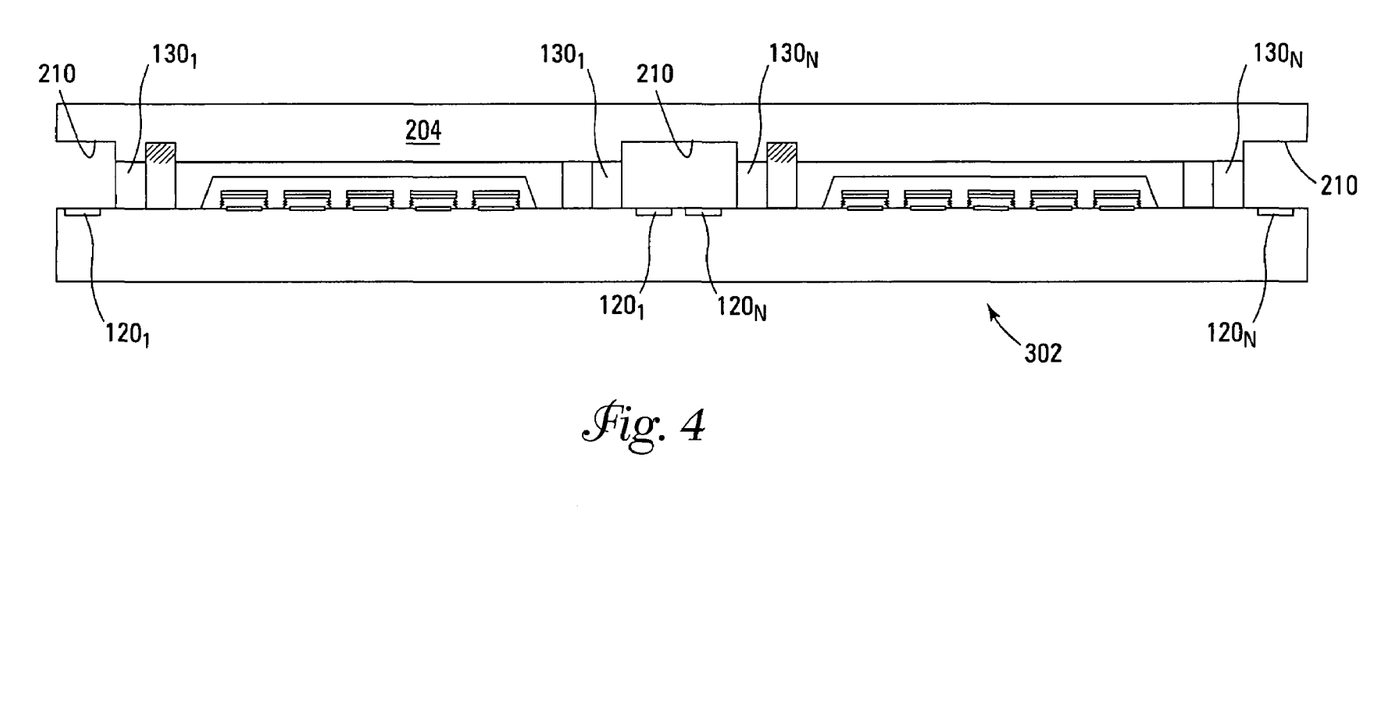
Figure 5:
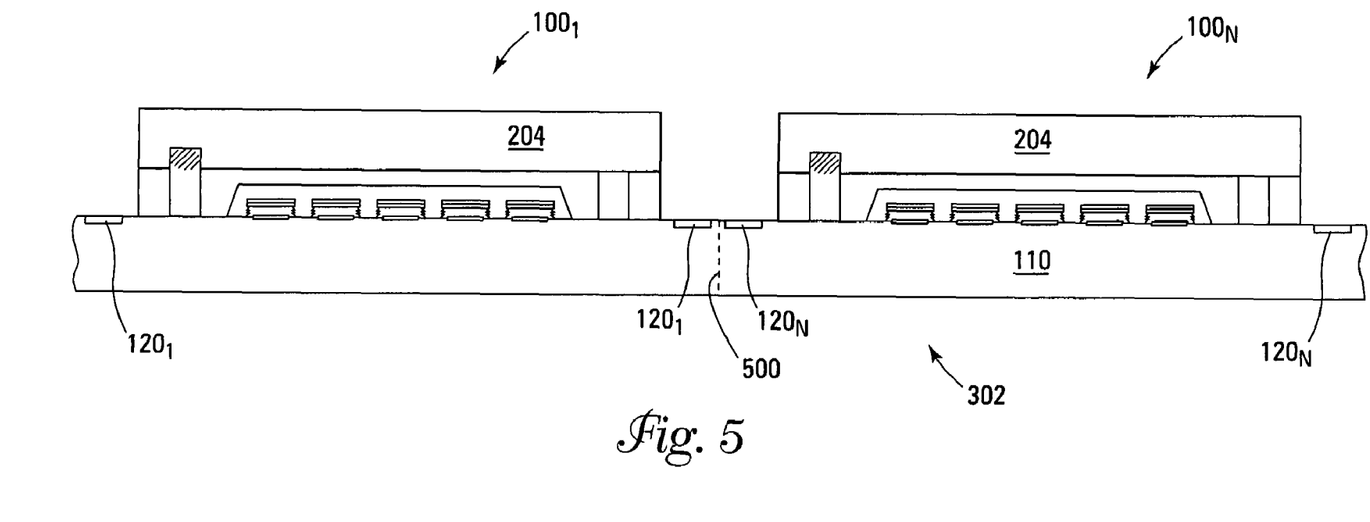

Transparent cover 204 is adhered to seal rings 130 of device wafer 302 in FIG. 4. Portions of transparent cover 204 at recesses 210 that are aligned with contacts 120 are removed, e.g., by sawing, in FIG. 5. The recesses act to prevent the saw blade from damaging the contacts. Substrate 110 is cut at line 500 of FIG. 5 to form a plurality of micro-displays 100.

Figure 6:
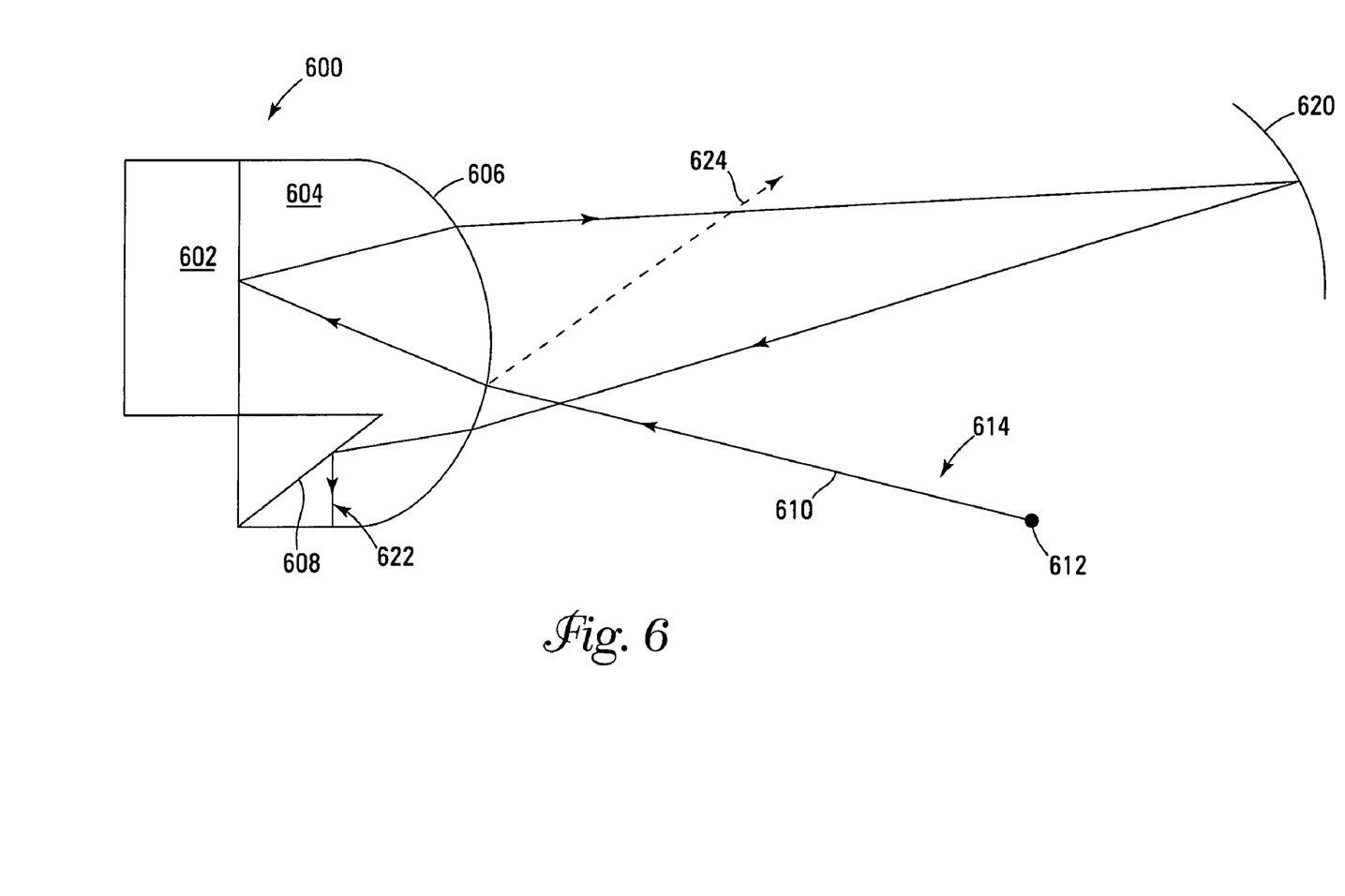
FIG. 6 illustrates a micro-display, according to another embodiment of the invention.

FIG. 6 illustrates a micro-display 600, e.g., as a portion of a digital projector, according to another embodiment of the invention. Micro display 600 includes a device chip 602, such as described for device chip 102 of FIG. 1, and a lens 604 adhered to device chip 602 that serves as a transparent cover of micro-display 600 and that may be index matched to device chip 602, e.g., using an index-matching medium as described above. For one embodiment, lens 604 is plano-convex and has a curved surface 606. For one embodiment, a mirror 608 is located between the curved surface 606 and device chip 602. For another embodiment, mirror 608 may be formed integrally with lens 604.

During operation, light 610 from a light source 612 of the projector is directed along an illumination path 614 of the projector to curved surface 606. Curved surface 606 refracts the light through lens 604 and onto device chip 602. When the pixels of device chip 602 are ON, they reflect light 610 back through lens 604 to curved surface 606. Curved surface 606 refracts light 610 onto a mirror 620 of the projector. Mirror 620 reflects light 610 onto mirror 608 that reflects light 610 onto a projection path 622 of the projector and ultimately to a projection screen. When the pixels of device chip 602 are OFF, they do not reflect light 610 back through lens 600 and ultimately onto the projection screen and thus produce a "black" state.

Regardless of whether the pixels are on or off, a portion 624 of light 610 is reflected by curved surface 606 before light 610 reaches the pixels. The curvature of the surface is selected so that the reflected light portion 624 is directed away from mirror 620 and thus is not directed onto projection path 622 and ultimately onto the projection screen. If the reflected light portion 624 is not directed away from mirror 620, it follows the path of light 610 when the pixels are on and eventually reaches the projection screen. This is especially detrimental when the pixels are OFF because it produces a lighter "black" state and thus reduces the contrast ratio.

Figure 7:
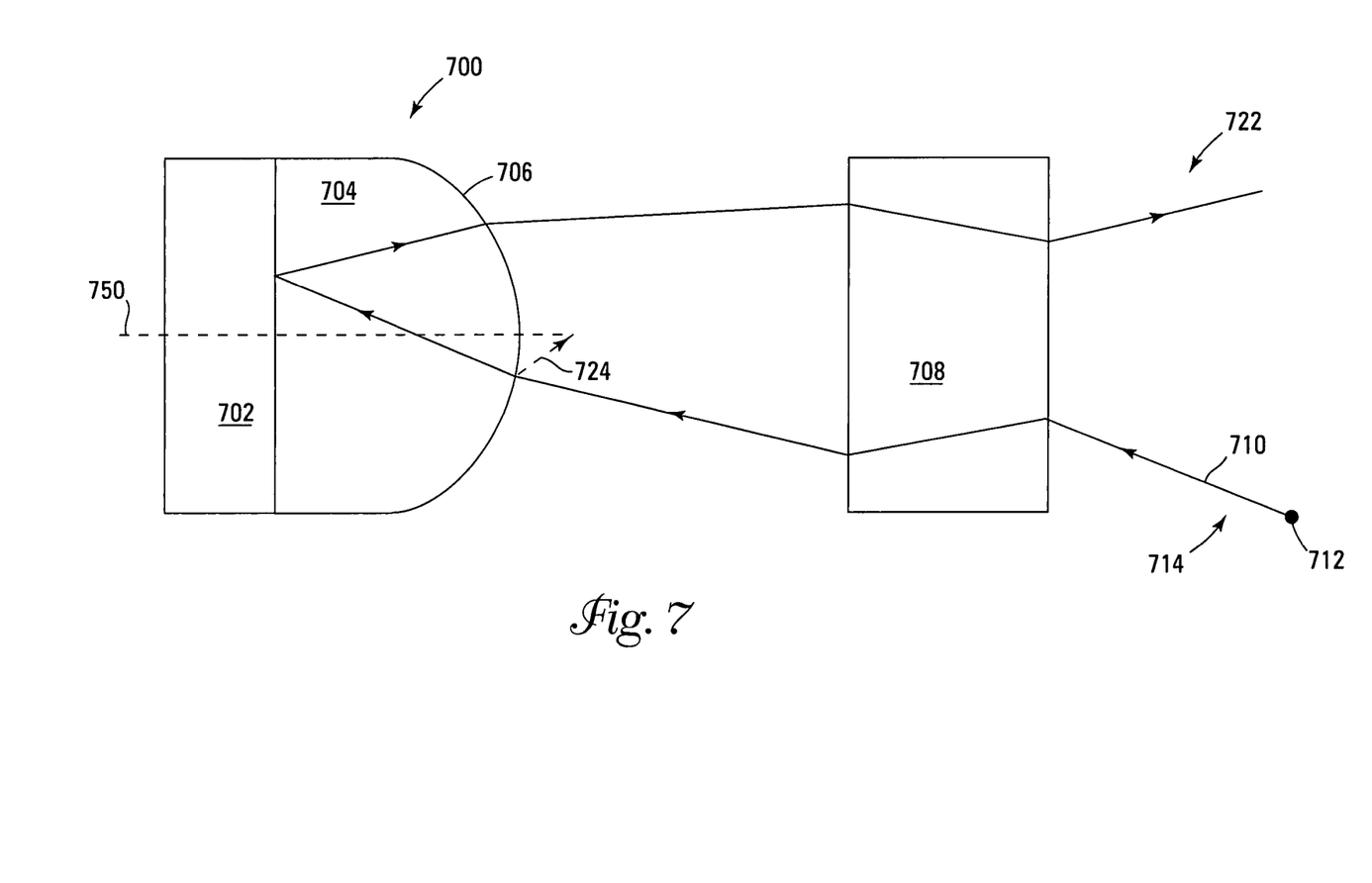
FIG. 7 illustrates a micro-display, according to an embodiment of the invention.

FIG. 7 illustrates a micro-display 700, e.g., as a portion of a digital projector, according to another embodiment of the invention. Micro display 700 includes a device chip 702, such as described for device chip 102 of FIG. 1, and a lens 704 adhered to device chip 702 that serves as a transparent cover of micro-display 700 and that may be index matched to device chip 702, e.g., using an index-matching medium as described above. Lens 704 has a curved surface 706.

During operation, light 710 from a light source 712 of the projector is directed along an illumination path 714 through a refraction system 708, e.g., a series of lenses, of the projector that refracts light 710 onto curved surface 706. Curved surface 706 refracts the light through lens 704 and onto device chip 702. When the pixels of device chip 702 are ON, they reflect light 710 back through lens 704 to curved surface 706. Curved surface 706 refracts light 710 to refraction system 708 that refracts light 710 onto a projection path 722 of the projector and ultimately to a projection screen. Regardless of whether the pixels are on or off, a portion 724 of light 710 is reflected by curved surface 706 before light 710 reaches the pixels. Reflected light portion 724 is reflected so that a substantial portion of light portion 724 does not reach projection path 722 and ultimately the projection screen.

For one embodiment, an axis 750 substantially bisects device chip 702 and lens 704 into two substantially symmetric halves. For another embodiment, the bisecting axes of device chip 702 and lens 704 are substantially parallel, but are offset. Moreover, for another embodiment, a prism or a sub-wavelength plate, e.g., a quarter wavelength plate, may replace lens 704.

Figure 8:
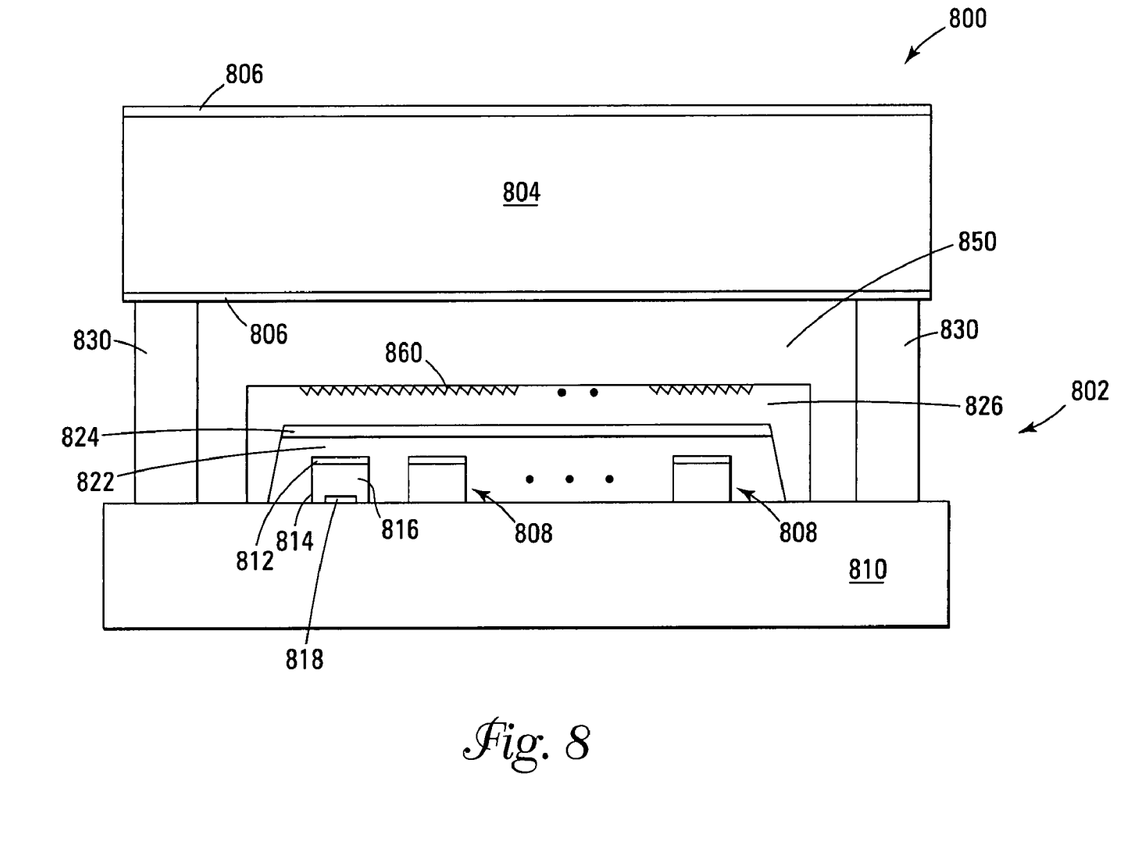
FIG. 8 is a cross-sectional view illustrating a micro-display, according to another embodiment of the invention.

FIG. 8 is a cross-sectional view illustrating a micro-display 800, e.g., as a portion of a digital projector, according to another embodiment of the invention. For one embodiment, micro-display 800 functions as a light modulator of the digital projector. Micro-display 800 includes a device chip 802 and a transparent cover 804, e.g., a glass cover having a low coefficient of expansion. For one embodiment, an anti reflective coating 806 may be applied to one or both sides of transparent cover 804 For another embodiment, transparent cover 804 may be a lens or a prism.

Device chip 802 includes an array of pixels 808 formed on a semiconductor substrate 810, e.g., of silicon or the like. For one embodiment, each pixel 808 is a MEMS device, such as a micro-mirror, liquid crystal on silicon (LcoS) device, interference-based modulator, etc. Specifically, for another embodiment, the MEMS device includes a micro-mirror 812 supported by flexures 814 so that a gap 816 separates the micro-mirror 812 from an electrode 818. A gap 822 separates micro-mirror 812 from a partially reflective layer 824, e.g., a tantalum aluminum (TaAl) layer, formed on the underside of a transparent layer 826, e.g., of TEOS (tetraethylorthosilicate) oxide, silicon oxide, etc., formed on substrate 810. Transparent layer 826 acts to reinforce and protect partially reflective layer 824.

Transparent cover 804 is adhered to a seal ring 830, e.g., by plasma bonding, gluing, or the like, that surrounds transparent layer 826 and protrudes from substrate 810 to form an enclosure 850 that encloses pixels 808, partially reflective layer 824, and transparent layer 826. For some embodiments, enclosure 850 is hermetically sealed by transparent cover and may contain a desiccant. A sub-wavelength grating 860 is formed in an upper surface of transparent layer 826, e.g., by patterning and etching. For one embodiment, grating 860 forms a quarter wavelength plate (or polarization retarder).

Figure 9:
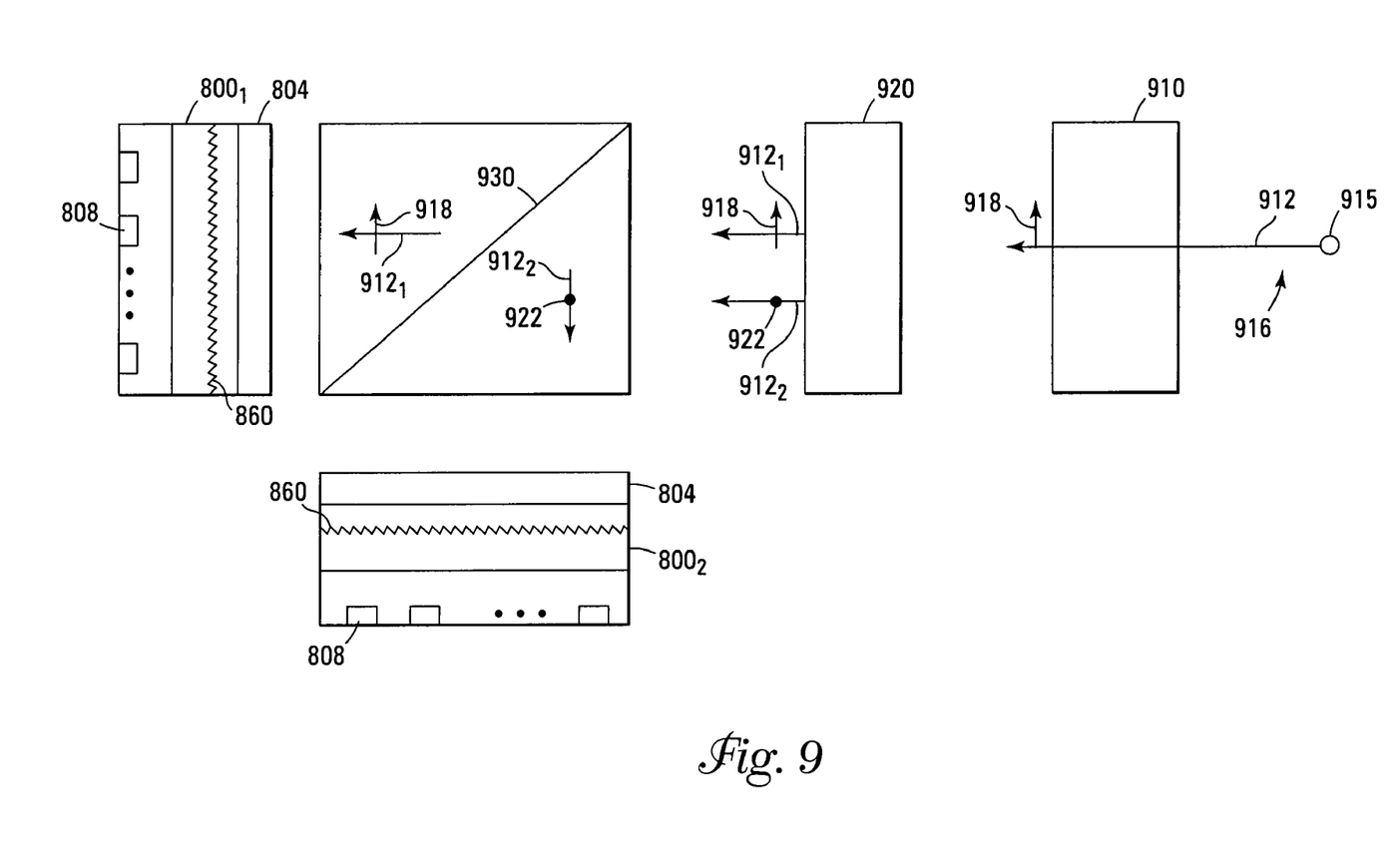
FIGS. 9-11 illustrate micro-displays in use, according to another embodiment of the invention.
Figure 10:
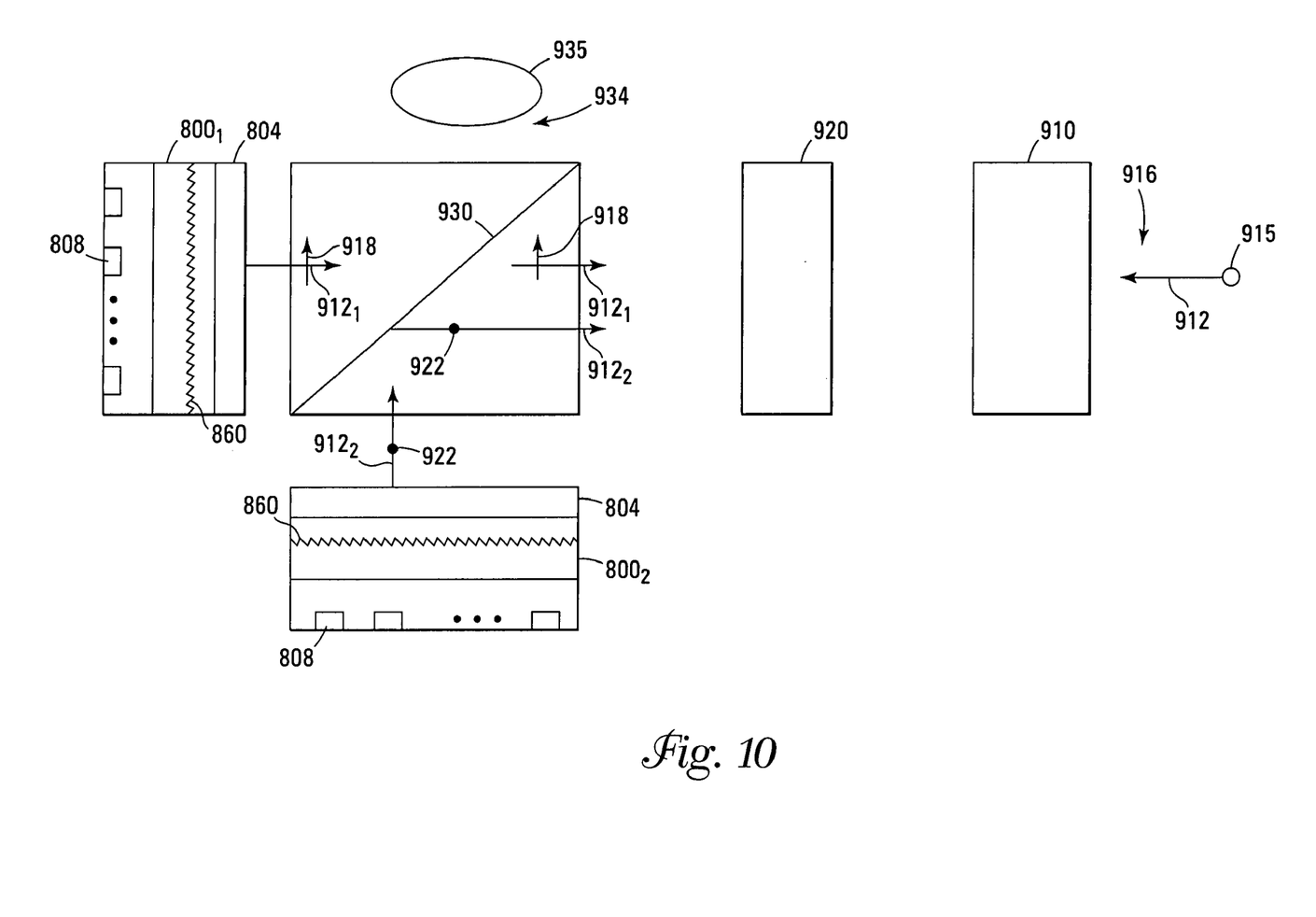
Figure 11:
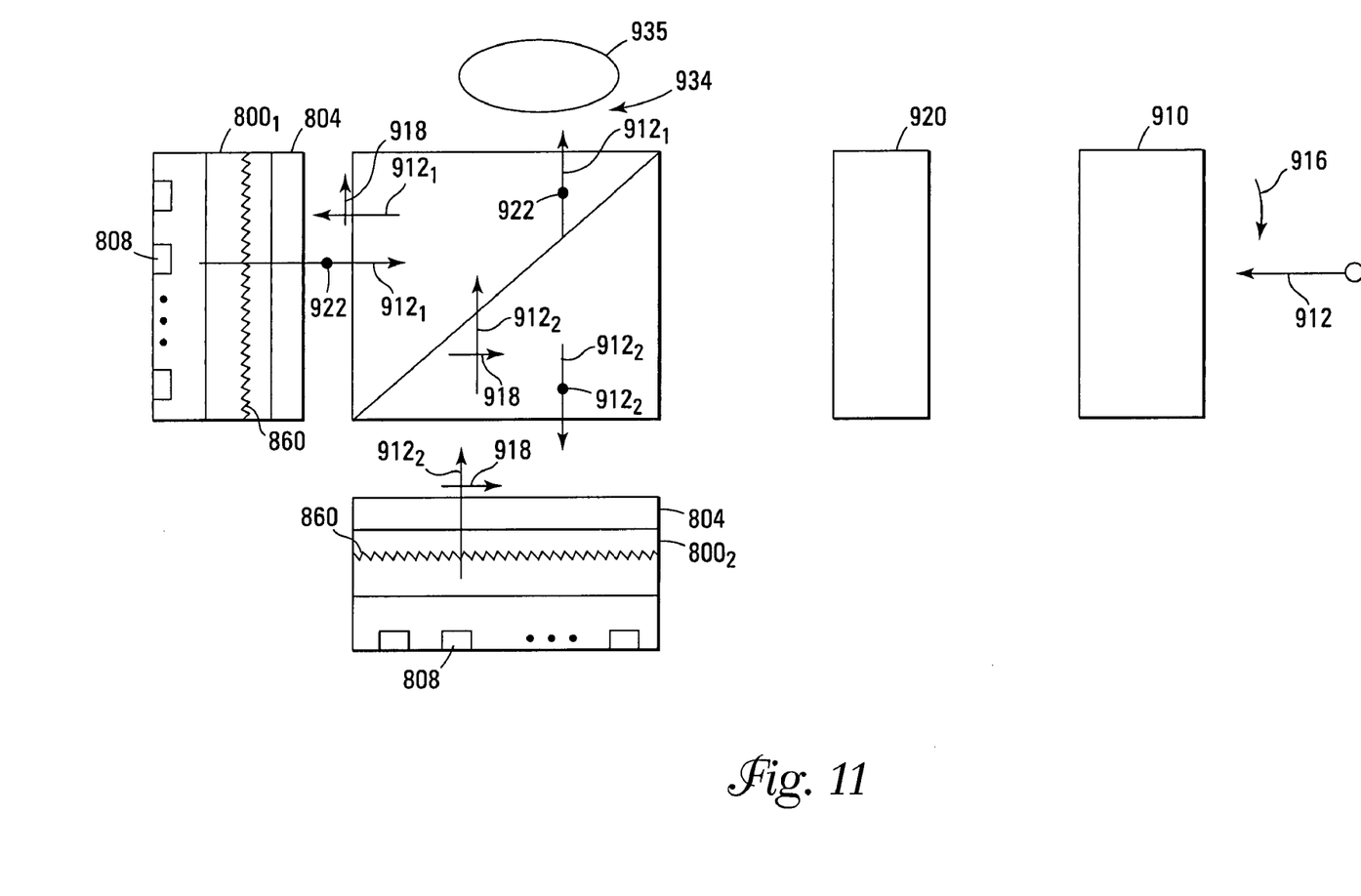

FIGS. 9-11 illustrate micro-displays 800 in use as portions of a projector, according to another embodiment of the present invention. Specifically, FIG. 9 illustrates light being delivered to micro-displays 800; FIG. 10 illustrates micro-displays 800 in an OFF or an ON state, and light being reflected off transparent cover 804 of each of micro-displays 800; and FIG. 11 illustrates micro-displays 800 in an ON state.

For one embodiment, micro-display $800_1$ receives light of one color, and micro-display $800_2$ receives light of another color. For example, micro-display $800_1$ may receive red light, and micro-display $800_2$ may receive blue and green light.

For another embodiment, the projector is an on-axis projector, meaning that a polarization recovery system 910 receives randomly polarized light 912 from a light source 915 along a illumination path 916 of the projector and polarizes the randomly polarized light to a first polarization, e.g., to linearly (or plane) polarized at a first polarization, as indicated by an arrow 918. For another embodiment, the light at the first polarization subsequently passes through a color select filter 920 that separates the light into color components $912_1$ and $912_2$ of the light 912 to be respectively received at micro-displays $800_1$ and $800_2$. For one embodiment, color component $912_1$ has the first polarization, as indicated by arrow 918, and color component $912_2$ has a second polarization, e.g., linearly (or plane) polarized at a second polarization, that for one embodiment, is rotated by 90 degrees from the first polarization, as indicated by dot 922. For another embodiment, color components $912_1$ and $912_2$ are respectively passed by a polarizing beam splitter 930 to micro-display $800_1$ and reflected by polarizing beam splitter 930 to micro-display $800_2$.

FIG. 10 shows that transparent cover 804 reflects color components $912_1$ and $912_2$ at their incoming polarizations, i.e., respectively at the first and second polarizations when micro-displays 800 are OFF or ON. Therefore, polarizing beam splitter 930 can pass the reflected light color component $912_1$ onto the illumination path 916 toward light source 915 and reflect the reflected light color component $912_2$ onto the illumination path 916 toward light source 915. This prevents the reflected color components $912_1$ and $912_2$ from being directed onto a projection path 934 and reaching a projection lens 935 of the projector when micro-displays 800 are OFF or ON.

It should be noted that the portions of color components $912_1$ and $912_2$ that are not reflected by transparent covers 804 pass into micro-displays 800 and are not reflected back through transparent covers 804 by pixels 808 when micro-displays 800 are OFF, as is the case when micro-displays 800 are ON. Rather, for some embodiments, pixels 808 direct the light away from transparent covers 804.

FIG. 11 shows that when micro-displays 800 are ON, color components $912_1$ and $912_2$ pass through transparent covers 804 and through grating (or quarter wavelength plate) 860 and are reflected back through quarter wavelength plate 860 by pixels 808. That is, color components $912_1$ and $912_2$ make two passes through the quarter wavelength plate 860 of their respective micro-displays 800. The two passes through quarter wavelength plate 860 rotates the polarization of color component $912_1$ from the first polarization, indicated by arrow 918, to the second polarization, indicated by dot 922, and the polarization of color component $912_2$ from the second polarization to the first polarization. As shown in FIG. 11, changing the polarization of color component $912_1$ enables polarizing beam splitter 930 to reflect it onto projection path 934 so that it reaches projection lens 935, and changing the polarization of color component $912_2$ enables polarizing beam splitter 930 to pass it to projection lens 935. It will be appreciated that the transparent covers 804 reflect the respective color components $912_1$ and $912_2$ regardless of whether the respective micro-displays 800 are on or off.

CONCLUSION

Although specific embodiments have been illustrated and described herein it is manifestly intended that this invention be limited only by the following claims and equivalents thereof.

What is claimed is:

1. A micro-display comprising:
   a device chip having a first transparent layer overlying one or more micro-electromechanical system devices;
   a transparent cover overlying the first transparent layer;
   a second transparent layer interposed between the transparent cover and the first transparent layer; and
   an index-of-refraction-matching medium interposed between the first and second transparent layers, wherein an index of refraction of the index-of-refraction-matching medium is substantially equal to an index of refraction of the first and second transparent layers and the transparent cover.

2. The micro-display of claim 1 further comprises a partial reflective layer disposed between the one or more micro-electromechanical system devices and the transparent layer.

3. The micro-display of claim 1, wherein the index-of-refraction-matching medium is selected from the group consisting of elastomers, gels, and liquids.

4. The micro-display of claim 1, wherein the transparent cover is a lens or a prism.

5. The micro-display of claim 1 further comprises a seal ring to which the transparent cover is adhered, the seal ring surrounding the transparent layer and the one or more micro-electromechanical system devices.

6. The micro-display of claim 1, wherein the transparent cover is glass.

7. The micro-display of claim 1, wherein the transparent layer is formed from a material comprising silicon oxides.

8. A micro-display comprising:
   one or more micro-electromechanical system devices formed on a substrate;
   a first transparent layer overlying the one or more micro-electromechanical system devices;
   a partial reflective layer interposed between the one or more micro-electromechanical system devices and the first transparent layer;
   a lens or a transparent cover overlying the first transparent layer;
   a second transparent layer formed on the lens or cover and interposed between the lens or cover and the first transparent layer;

an index-of-refraction-matching medium interposed between the first and second transparent layers, wherein an index of refraction of the index-of-refraction-matching medium is substantially equal to an index of refraction of the first and second transparent layers and the lens or cover.

9. The micro-display of claim 8, wherein the device chip further comprises a seal ring to which the second transparent layer is adhered.

10. A method of forming one or more micro-displays, comprising:
   forming one or more sets of one or more micro-electromechanical system devices on a semiconductor substrate;
   forming one or more first transparent layers respectively overlying the one or more sets of one or more micro-electromechanical system devices;
   forming one or more seal rings respectively around the one or more first transparent layers and their corresponding one or more micro-electromechanical system devices to respectively define one or more device chips;
   dispensing an index-of-refraction-matching medium on the one or more first transparent layers of the one or more device chips;
   forming a second transparent layer on a transparent cover;
   adhering the second transparent layer formed on the transparent cover to the one or more seal rings of the one or more device chips such that the one or more device chips respectively adhere to different portions of the second transparent layer and such that the index-of-refraction-matching medium is interposed between the one or more first transparent layers and the second transparent layer and the cover overlies the second transparent layer;
   wherein an index of refraction of the index-of-refraction-matching medium is substantially equal to an index of refraction of each of the one or more first transparent layers, the second transparent layer, and the cover.

11. The method of claim 10 wherein the first and second transparent layers are of silicon oxides and the cover is glass.

12. The method of claim 10, wherein the index-of-refraction-matching medium is an elastomer.

13. The method of claim 10, wherein adhering second transparent layer to the one or more seal rings comprises plasma-enhanced bonding.

14. The method of claim 10 wherein adhering second transparent layer to the one or more seal rings further comprises forming one or more gaps for containing the index-of-refraction-matching medium.

15. A method of forming one or more micro-displays, comprising:
   forming one or more sets of one or more micro-electromechanical system devices on a semiconductor substrate;
   forming one or more first transparent layers respectively overlying the one or more sets of one or more micro-electromechanical system devices;
   forming one or more seal rings respectively around the one or more first transparent layers and their corresponding one or more micro-electromechanical system devices to respectively define one or more device chips;
   dispensing an index-of-refraction-matching medium on the one or more first transparent layers of the one or more device chips;
   adhering a transparent cover to the one or more seal rings of the one or more device chips such that the one or more device chips respectively adhere to different portions of the cover and such that the index-of-refraction-matching medium is disposed between the one or more first transparent layers and the cover; and
   separating one of the one or more device chips from another of the one or more device chips after the transparent cover is adhered to the respective device chips to form the one or more micro-displays, each comprising one of the one or more device chips and the portion of the transparent cover adhered thereto;
   wherein an index of refraction of the index-of-refraction-matching medium is substantially equal to an index of refraction of each of the one or more first transparent layers and the cover.

16. The method of claim 15 wherein separating one of the one or more device chips from another of the one or more device chips after the transparent cover is adhered to the respective device chips comprises severing the cover and the semiconductor substrate between the respective one or more device chips.

17. The method of claim 10, wherein the transparent cover is a lens or a prism.

18. The micro-display of claim 1, wherein the first and second layers are of the same materials.

19. The micro-display of claim 6, wherein the first and second layers are of TEOS.

20. The method of claim 10 wherein forming the second transparent layer on the transparent cover comprises depositing the second transparent layer on the transparent cover using chemical vapor deposition.

* * * * *

UNITED STATES PATENT AND TRADEMARK OFFICE
CERTIFICATE OF CORRECTION

PATENT NO. : 7,436,571 B2  Page 1 of 1
APPLICATION NO. : 10/971637
DATED : October 14, 2008
INVENTOR(S) : John R Sterner et al.

It is certified that error appears in the above-identified patent and that said Letters Patent is hereby corrected as shown below:

In column 7, line 37, in Claim 11, after "claim 10" insert --,--.

In column 7, line 44, in Claim 14, after "claim 10" insert --,--.

In column 8, line 31, in Claim 16, after "claim 15" insert --,--.

In column 8, line 43, in Claim 20, after "claim 10" insert --,--.

Signed and Sealed this

Seventeenth Day of March, 2009

JOHN DOLL
*Acting Director of the United States Patent and Trademark Office*